US012580906B2

(12) United States Patent
Muleshkov et al.

(10) Patent No.: US 12,580,906 B2
(45) Date of Patent: Mar. 17, 2026

(54) INTERFACE FOR CREATING A CERTIFICATE-ENFORCED NETWORK FOR DEVICES IN A LOGICAL GROUP

(71) Applicant: Omnissa, LLC, Mountain View, CA (US)

(72) Inventors: Georgi Muleshkov, Sofia (BG); Milen Donchev, Sofia (BG); Rumen Georgiev, Sofia (BG); Lyubomir Dimitrov, Sofia (BG); Steven Murhammer, Atlanta, GA (US)

(73) Assignee: Omnissa, LLC, Mountain View, CA (US)

( * ) Notice: Subject to any disclaimer, the term of this patent is extended or adjusted under 35 U.S.C. 154(b) by 319 days.

(21) Appl. No.: 18/216,378

(22) Filed: Jun. 29, 2023

(65) Prior Publication Data

US 2025/0007900 A1     Jan. 2, 2025

(51) Int. Cl.
*H04L 9/40*          (2022.01)
(52) U.S. Cl.
CPC ...... *H04L 63/0823* (2013.01); *H04L 63/0876* (2013.01)
(58) Field of Classification Search
CPC ........................ H04L 63/0823; H04L 63/0876
See application file for complete search history.

(56) References Cited

U.S. PATENT DOCUMENTS

2017/0180459 A1* 6/2017 Frank .................. H04L 41/0866
2019/0081982 A1* 3/2019 Breton .................... G06F 21/57
2021/0367975 A1* 11/2021 Wood .................. H04L 41/5054
2023/0403305 A1* 12/2023 Dementyev .......... H04L 63/104

* cited by examiner

*Primary Examiner* — Mohamed A. Wasel
(74) *Attorney, Agent, or Firm* — Kim & Stewart LLP

(57)          ABSTRACT

A single graphical user interface ("GUI") for creating a certificate-enforced network for devices in a logical group is provided. The GUI can include a certificate upload tool for uploading a security certificate file for a new network, a logical group selection tool for selecting a logical group of computing devices to add to the network, and a network configuration tool for configuring settings for the network. An application of the GUI can send the security certificate file to a third-party network configuration manager that responds with a certificate identifier ("ID"). Without additional user action required, the application can input the certificate ID into a request to create the network that includes the network settings and the logical group selection. The third-party network configuration manager can then create the network using the information provided by the application.

20 Claims, 5 Drawing Sheets

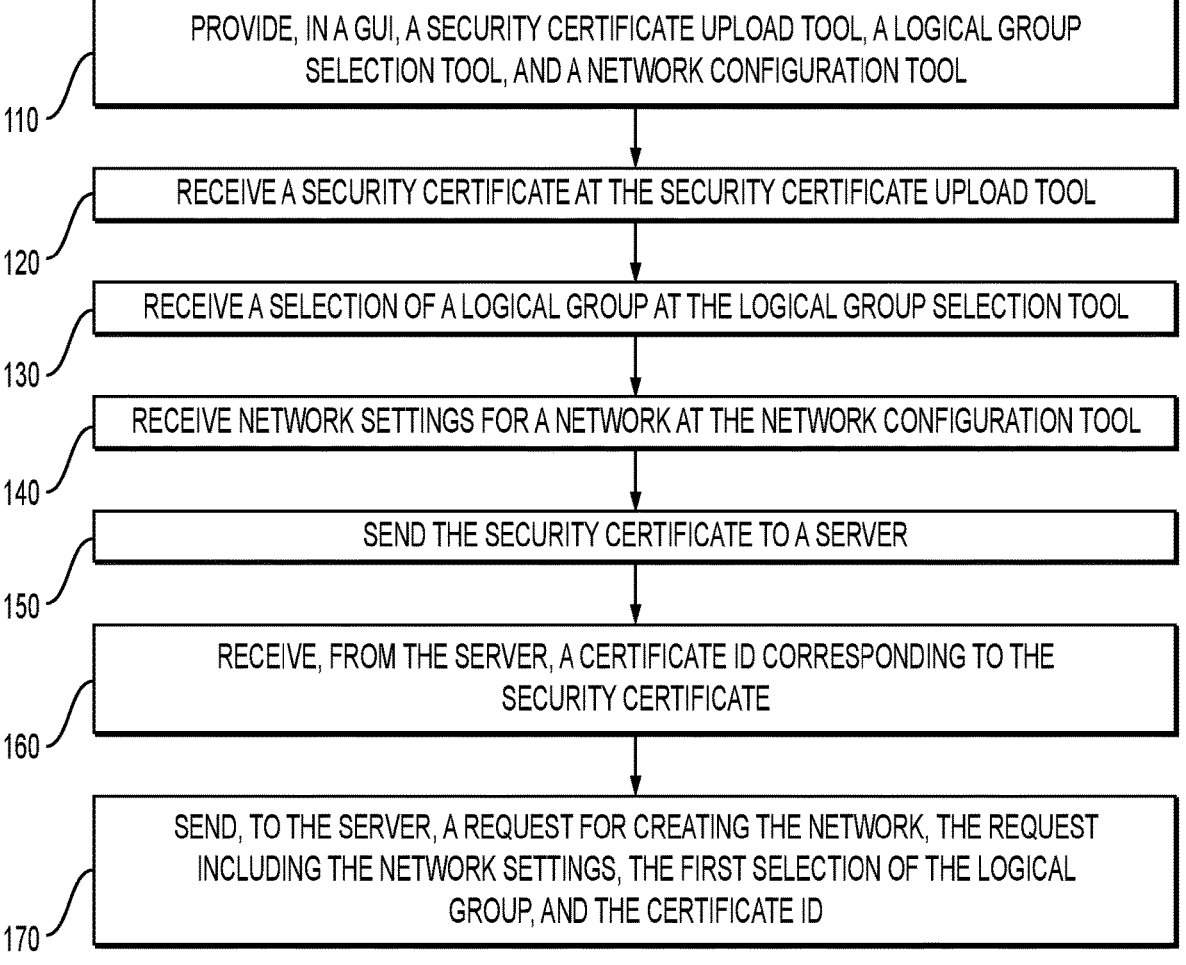

110 — PROVIDE, IN A GUI, A SECURITY CERTIFICATE UPLOAD TOOL, A LOGICAL GROUP SELECTION TOOL, AND A NETWORK CONFIGURATION TOOL

120 — RECEIVE A SECURITY CERTIFICATE AT THE SECURITY CERTIFICATE UPLOAD TOOL

130 — RECEIVE A SELECTION OF A LOGICAL GROUP AT THE LOGICAL GROUP SELECTION TOOL

140 — RECEIVE NETWORK SETTINGS FOR A NETWORK AT THE NETWORK CONFIGURATION TOOL

150 — SEND THE SECURITY CERTIFICATE TO A SERVER

160 — RECEIVE, FROM THE SERVER, A CERTIFICATE ID CORRESPONDING TO THE SECURITY CERTIFICATE

170 — SEND, TO THE SERVER, A REQUEST FOR CREATING THE NETWORK, THE REQUEST INCLUDING THE NETWORK SETTINGS, THE FIRST SELECTION OF THE LOGICAL GROUP, AND THE CERTIFICATE ID

FIG. 1

INTERFACE FOR CREATING A CERTIFICATE-ENFORCED NETWORK FOR DEVICES IN A LOGICAL GROUP

BACKGROUND

Some enterprises use third-party systems for creating and managing networks, such as virtual cloud-based networks. Creating a virtual network in a third-party system can provide an enterprise with a flexible and scalable infrastructure that can adapt to changing business needs. Some such networks use security certificates to protect communications exchanged on the network. For example, the network can require that computing devices use a designated security certificate when communicating with each other or with a particular component in the network, such as an application server.

Currently, if someone wants to create a certificate-enforced network using a third-party system, it typically involves a cumbersome process that requires using multiple applications or interfaces. For instance, to get started, the user must first upload a security certificate to the third-party system, and this requires using a first interface. Once this is done, the third-party system responds with a certificate identifier ("ID"). This ID is then provided by the user to a second interface to configure the network.

This process can be frustrating and time-consuming. It involves multiple steps, and each step needs to be completed correctly for the process to work. There is a high risk of manual errors when the user is required to provide the certificate ID to the second interface. As a result, the current process is not user-friendly and wastes a lot of time.

A need exists for a single interface that allows a user to provide a security certificate and define a network using the certificate.

SUMMARY

Examples described herein include systems and methods for providing a GUI for creating a certificate-enforced network for devices in a logical group. The GUI can allow an administrator ("admin") user to both provide a security certificate and create a new network through a third-party network configuration manager. In an example, the GUI can include various tools that allow a user to define a certificate-enforced network with a third-party network configuration manager. For example, the GUI can include a security certificate upload tool, a logical group selection tool, and a network configuration tool. The security certificate upload tool can allow an admin user to upload a security certificate. An application of the GUI can send the uploaded certificate to the network configuration manager and receive an associated certificate ID in return.

In the same GUI, the admin user can configure a new network using the network configuration tool. For example, using the network configuration tool, the admin user can name the network, create a Service Set Identifier ("SSID"), set whether to make the network hidden, set whether computing devices can automatically connect to the network, set the type of security used, set an extensible authentication protocol ("EAP") method, set whether a server certificate is checked, select a server certificate to use, and select a client certificate to use. The type of security used can include WIFI encryption protocols, such as Wired Equivalent Privacy ("WEP"), Wi-Fi Protected Access ("WPA"), and WIFI Protected Access Version 2 ("WPA2"). Setting an EAP method can include selecting one from a list of available EAP methods, such as EAP-Transport Layer Security ("TLS"), EAP-Tunneled Transport Layer Security ("TTLS"), and EAP-Authentication and Key Agreement ("AKA").

In the same GUI, the admin user can select a logical group for the network using the logical group selection tool. A logical group can be a virtual representation of a group of computing devices. The logical group selection tool can populate a list of logical groups that can be added to the network. In one example, the logical groups can be configured at the network configuration manager, and logical group selection tool can be populated with a list of logical groups provided by the network configuration manager. The admin user can select a logical group from the list.

The GUI allows the admin user to provide a security certificate for the network, configure the network, and select the devices to add to the network, all within the same interface. For example, after receiving the network information from the admin user, the application can use the network configuration manager's Application Programming Interface ("API") to send the security certificate and receive a corresponding certificate ID. Without additional action from the admin user, the application can then send a network creation request that includes the certificate ID, the network settings, and the selected logical group. The network configuration manager can then create the network and apply the network settings to computing devices assigned to the logical group. This can include providing the security certificate to the computing device. The application can apply the network settings to any computing devices not managed by the network configuration manager.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 1 is a flowchart of an example method for providing a GUI for creating a certificate-enforced network for devices in a logical group.

DESCRIPTION OF THE EXAMPLES

Figure 2:
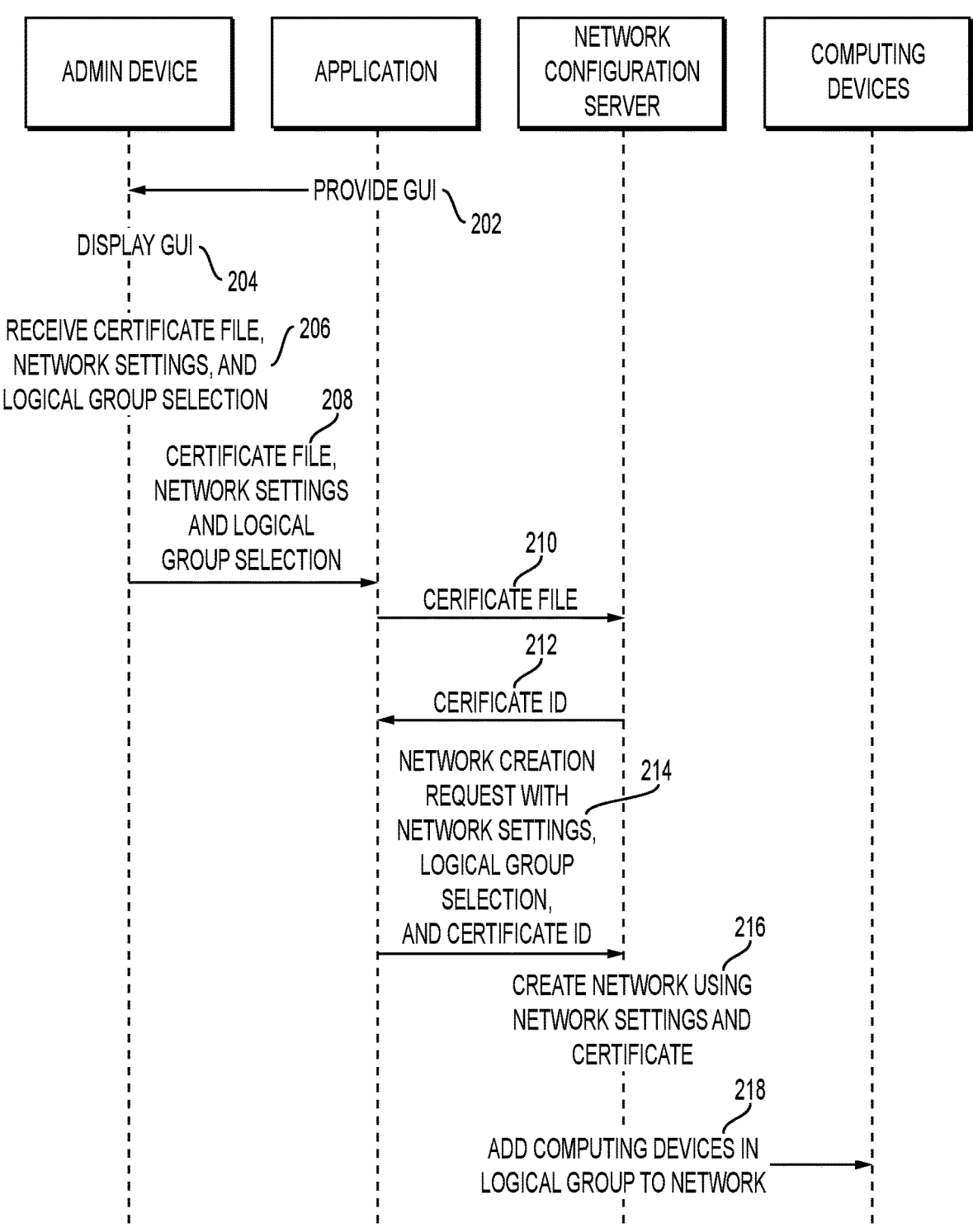
FIG. 2 is a sequence diagram of an example method for providing a GUI for creating a certificate-enforced network for devices in a logical group.

Reference will now be made in detail to the present examples, including examples illustrated in the accompanying drawings. Wherever possible, the same reference numbers will be used throughout the drawings to refer to the same or like parts.

Systems and methods are described for providing a single GUI for creating a certificate-enforced network for devices in a logical group. The GUI can include a certificate upload tool for uploading a security certificate file for a new network, a logical group selection tool for selecting a logical group of computing devices to add to the network, and a network configuration tool for configuring settings for the network. An application of the GUI can send the security certificate file to a third-party network configuration manager that responds with a certificate ID. Without additional user action required, the application can input the certificate ID into a request to create the network that includes the network settings and the logical group selection. The third-party network configuration manager can then create the network using the information provided by the application.

FIG. 1 is a flowchart of an example method for providing a GUI for creating a certificate-enforced network for devices in a logical group. At stage 110, an application can provide such a GUI to an admin device. The GUI can be a front-end interface of an application that a user can interact with for creating networks using a third-party network manager. The application can be hosted by one or more servers or a group of servers, including multiple servers implemented virtually across multiple computing platforms. For example, the application can be hosted by a web server, and an admin user can access the application through a web browser. Alternatively, the application as a whole, the GUI, or other components of the application may be installed directly on an admin's user device. Actions described herein as being performed by the GUI can be performed by the corresponding application or service rather than the GUI itself.

The GUI can include various tools that allow a user to define a network with a third-party network manager from a single interface. For example, the GUI can include a security certificate upload tool, a logical group selection tool, and a network configuration tool. The security certificate upload tool can allow an admin user to upload a security certificate. The security certificate can be a certificate data file of any appropriate file type, such as a .pem, .crt, .cer, or .key file.

At stage 120, the admin user can upload the security certificate file from the admin user device using the security certificate upload tool. For example, the security certificate upload tool can open a window where the admin user can navigate through data files on the admin user device and select a security certificate file. The application can store the security certificate file in a secure location, such as at an encrypted database.

At stage 130, the admin user can select a logical group using the logical group selection tool. A logical group can be a virtual representation of a group of computing devices. For example, computing devices can be assigned to groups in an organization based on shared characteristics, such as servers that host an application, user devices for users with similar roles, and so on. The computing devices can be physical or virtual devices. For example, computing devices can include smart phones, tablets, personal computers, physical and virtual servers, physical and virtual network devices, virtual machines, and so on.

In an example, the logical group selection tool can include a selectable list of logical groups in an organization. The list of logical groups can be retrieved from another location and populated in the GUI. For example, the logical groups can be defined at the third-party network manager. When the admin user loads the GUI, the application can retrieve the list from the third-party network manager and populate the list in the logical group selection tool. The admin user can select the logical group that includes computing devices to be added to the network being created.

At stage 140, the admin user can input network settings using the network configuration tool. For example, using the network configuration tool, the admin user can name the network, create an SSID, set whether to make the network hidden, set whether computing devices can automatically connect to the network, set the type of security used, set an EAP method, set whether a server certificate is checked, select a server certificate to use, and select a client certificate to use. The type of security used can include WIFI encryption protocols, such as WEP, WPA, and WPA2. Setting an EAP method can include selecting one from a list of available EAP methods, such as EAP-TLS, EAP-TTLS, and EAP-AKA.

A check for a server certificate authority can determine whether the network requires a certificate for authentication, such as the certificate uploaded at stage 130. When an admin user enables the setting for using a certificate authority, the network configuration tool can display a server certificate selection tool, which can be a GUI element that allows the admin user to select a certificate to use. As an example, the server certificate selection tool can be a drop-down menu populated with a list of previously uploaded server certificates. For example, a certificate can appear in the server certificate selection tool after an admin user uploads the certificate using the security certificate upload tool.

At stage 150, the application can send the security certificate to a network configuration manager. The application can send the security certificate using any appropriate communication protocol, such as an API call. For example, where the network configuration manager is hosted by a third-party, the application can send the security certificate using the third-party's API protocols. In some examples, the network configuration manager includes code executing on a server remote from the GUI.

At stage 160, the application can receive a certificate ID for the security certificate from the network configuration manager. For example, after receiving the security certificate, the network configuration manager can store the certificate in a secure location and generate an associated certificate ID. The network configuration manager can then send the certificate ID to the application using any appropriate communication protocol, such as the API protocols described above.

In one example, stages 150 and 160 can occur prior to stage 140. For example, the application can send the security certificate to the network configuration manager after the admin user uploads the security certificate using the security certificate upload tool. The network configuration manager can generate the certificate ID and associate the certificate ID with the security certificate data file. When the admin user accesses the network configuration tool of the GUI, the network configuration manager can provide the certificate ID of the uploaded certificate along with the certificate IDs of other certificates previously provided. The admin user can then select the certificate using the server certificate selection tool.

At stage 170, the application can send, to the server, a request for creating a network to the network configuration manager. The request can include the network settings, the selected logical group, and the certificate ID of the selected security certificate. The application can send the request using any appropriate communication protocol, such as the API protocols described previously.

In response to the request, the network configuration manager can create a network with the settings designated in the request. The manner in which the network is created can depend on how the network configuration manager functions and the computing devices being added to the network. For example, the logical group can include computing devices, such as user devices, that are managed by a system that allows enterprises to manage work-related applications and data on the enrolled devices, such as a Unified Endpoint Management ("UEM") system. In a UEM system, a management agent can be installed on the enrolled devices. The management application can be responsible for ensuring that the enrolled devices are up to date with compliance and security settings prior to accessing enterprise data and resources. The management application can communicate with a management server, allowing UEM management of the computing devices based on compliance and security settings at the management server. When adding enrolled computing devices in a logical group to the network, the network configuration manager can first create the network using the provided network settings. The application can then send the network settings and the security certificate to the management application on the computing devices in the logical group. The management application can then configure the computing devices to access the network.

In an alternative example, the logical group can include computing devices that are managed by a cloud-based UEM system that directly manages enrolled devices without the need for a UEM management application. Some examples of such services include GOOGLE ENDPOINT MANAGEMENT and MICROSOFT INTUNE. In some examples, when a computing device is enrolled in a cloud-based UEM system, the cloud-based UEM system can be given permission to configure various settings on the computing device by communicating with the computing device's operating system ("OS"). Examples of such settings can include WIFI and virtual private network ("VPN") settings, passcode policies, and app configurations. The cloud-based UEM system can push configurations to the devices, without requiring any user interaction. In such systems, the network configuration manager can push the network settings to the computing devices in the logical group, including pushing the security certificate needed to access the network.

In another example, the logical group can include cloud-based computing devices, such as VMs that are hosted as cloud computing services. Some examples of cloud computing service providers include GOOGLE CLOUD PLATFORM, MICROSOFT AZURE, and AMAZON WEB SERVICES ("AWS"). The network configuration manager can push the network configuration settings and the security certificate directly to such cloud-based computing devices.

In an example of the method described above, the logical group can include a first set of computing devices managed by a UEM application, a second set of computing devices managed by a third-party cloud-based UEM system, and VMs running in a third-party cloud computing platform. The network configuration manager can execute within the cloud computing environment. When creating the network, the application can send the network settings and security certificate to the management application running on the first set of computing devices, and push the network settings and security certificate to the second set of computing devices and the VMs.

The method described above allows an admin user to create a certificate-enforced network based on logical groups from a single interface. For example, rather than upload the security certificate in one interface and then create a network in another interface where the certificate is specified, the application and associated GUI described herein allows an admin user to do both in one location.

FIG. 2 is a sequence diagram of an example method for providing a GUI for creating a certificate-enforced network for devices in a logical group. At stage 202, an application can provide a GUI to an admin device. The GUI can be a front-end interface of an application that a user can interact with for creating networks based on logical groups using a third-party network manager. In one example, the application as a whole, the GUI, or other components of the application can be installed directly on the admin device. In such an example, the admin user can load the application on the admin device, and the application can cause the GUI to display on the admin device's display at stage 204.

Alternatively, the application can be hosted by a web server, and the admin user can access the application through a web browser. For example, the admin user can enter a uniform resource locator ("URL") associated with the application into a web browser. The admin device can send a hypertext transfer protocol secure ("HTTPS") request that gets routed to the web server, and the application can respond by sending a hypertext markup language ("HMTL") file with the GUI to the admin device. Then, at stage 204, the admin device's browser can render the GUI on the admin device's display.

At stage 206, a user can provide a security certificate, network settings, and a selection of a logical group at the GUI. For example, the GUI can include various tools that allow the admin user to define a network with a third-party network manager from a single interface. These tools can include a security certificate upload tool, a logical group selection tool, and a network configuration tool. The admin user can provide the security certificate by uploading the certificate's data file using the security certificate upload tool. The security certificate's data file can be of any appropriate file type, such as a .pem, .crt, .cer, or .key file.

The admin user can use the logical group selection tool for selecting a logical group. For example, the logical group selection tool can include a selectable list of logical groups in an organization. The list of logical groups can be retrieved from another location and populated in the GUI. For example, the logical groups can be defined at the third-party network manager. When the admin user loads the GUI, the application can retrieve the list from the third-party network manager and populate the list in the logical group selection tool. The admin user can select the logical group that includes computing devices to be added to the network being created.

The admin user can use the network configuration tool for inputting network settings of the network. For example, the network configuration tool can include options for naming the network, creating an SSID, setting whether to make the network hidden, setting whether computing devices can automatically connect to the network, setting the type of security used, setting an EAP method, setting whether a server certificate is checked, selecting a server certificate to use, and selecting a client certificate to use. Security types can include WIFI encryption protocols, such as WEP, WPA, and WPA2. EAP methods can include any appropriate EAP method, such as EAP-TLS, EAP-TTLS, and EAP-AKA.

At stage 208, the admin device can send the security certificate, network settings, and the logical group selection to the application. For example, after the user uploads the security certificate, selects the logical group, and inputs the network settings, the admin device can send them to the application using any appropriate communication protocol. As an example, the admin device can use an API call if the application is installed on the admin device. Alternatively, the admin device can use an HTTPS call if the application is web-based and accessed through a browser.

In one example, the security certificate can be sent separately from the logical group selection and network settings. For example, the security certificate upload tool can include a selection mechanism, such as a selectable button, that the admin user can select to upload a security certificate. In response to the user selecting the button, the GUI can send the security certificate to the application.

In one example, the application can store a copy of the security certificate in a secure location. This can allow the application to later provide the security certificate to computing devices in the selected logical group that are managed by an associated UEM.

At stage 210, the application can send the security certificate to a network configuration manager. For example, the application can make an API call to the network configuration manager with the security certificate. In response, at stage 212, the network configuration manager can send a certificate ID for the security certificate to the application. This can also be done using an API call. In one example, the network configuration manager can create a certificate ID specific to the security certificate.

The application can store the certificate ID locally for additional user. Storing the certificate ID locally can mean storing the certificate ID at a storage device that is not part of the third-party system. For example, the application can store the certificate ID in a local cache or at a database that is part of the same computing system as the application, such as a database in a UEM system. The application can also associate the certificate ID with the security certificate itself. For example, the application can add the certificate ID to a data table that references certificate IDs to their corresponding certificates.

The application can send the security certificate any time after the user uploads the security certificate until the admin device sends the network settings and logical group selection to the application. For example, the GUI can allow the admin user to upload the security certificate before inputting network settings and selecting a logical group, such as in a separate window of the GUI. This can allow the GUI to include the security certificate in a server certificate selection tool in the network settings. The server certificate selection tool can include a selectable list of available certificates that can be used for securing the network. Each certificate populated in the server certificate selection tool can be a reference to the corresponding certificate ID or location of the corresponding security certificate.

In one example, the security certificates displayed in the security certificate selection tool can be based on the selected logical group. For example, when an admin user uploads a security certificate using the security certificate upload tool, the GUI can require that the admin user also select a logical group using the logical group selection tool. The third-party system (and the application) can associate the uploaded certificate with the selected logical group so that the certificate is unique to the logical group. As an example, the GUI can require an admin user to first select a logical group. Other fields in the GUI can be populated based on the selected logical group. For example, the security certificate selection tool can be populated with a list of security certificates unique to the logical group. Also, any security certificates uploaded by the admin user after selecting the logical group can be automatically associated with the logical group.

At stage 214, the application can send a request for creating a network to the network configuration manager. The request can include the network settings, selected logical group, and the certificate ID. The application can send this information using any appropriate communication protocol, such as the API protocols described above. In one example, the application can initially store the certificate ID in a local cache. The application can insert the certificate ID from the local cache into the request. The application can then (or alternatively before making the request) store the certificate ID at a different storage location for longer term storage, such as a local or in-network database.

At stage 216, the network configuration manager can create a network based on the request. The network configuration manager can create the network using the network settings provided by the admin user. For example, the network can include the network name, SSID, security protocols, and other settings selected by the admin user. The network can be secured using the security certificate provided by the admin user.

At stage 218, the network configuration manager can add computing devices in the logical group to the network. The manner in which computing devices are added can depend on the device type and the manner in which the devices are managed. For example, the network configuration manager can notify the application when the network is created, and the application can add user devices managed by a UEM system by sending instructions to a management application running on the user devices. The instructions can include the appropriate network settings, which the management application can apply to the user devices. For computing devices managed by a cloud-based UEM system, the network configuration manager can push the network settings directly to the devices. The network configuration manager can also push the network settings to VMs and other computing devices hosted in a cloud computing environment.

In one example, the network can be a virtual private cloud ("VPC") network. A VPC can be a secure, isolated private cloud hosted within a public cloud. As an example, the network configuration manager can apply the network settings to VM servers from the selected logical group that are hosted within a cloud computing platform. Network settings for accessing the VMs can be applied to other computing devices in the logical group.

Figure 3:
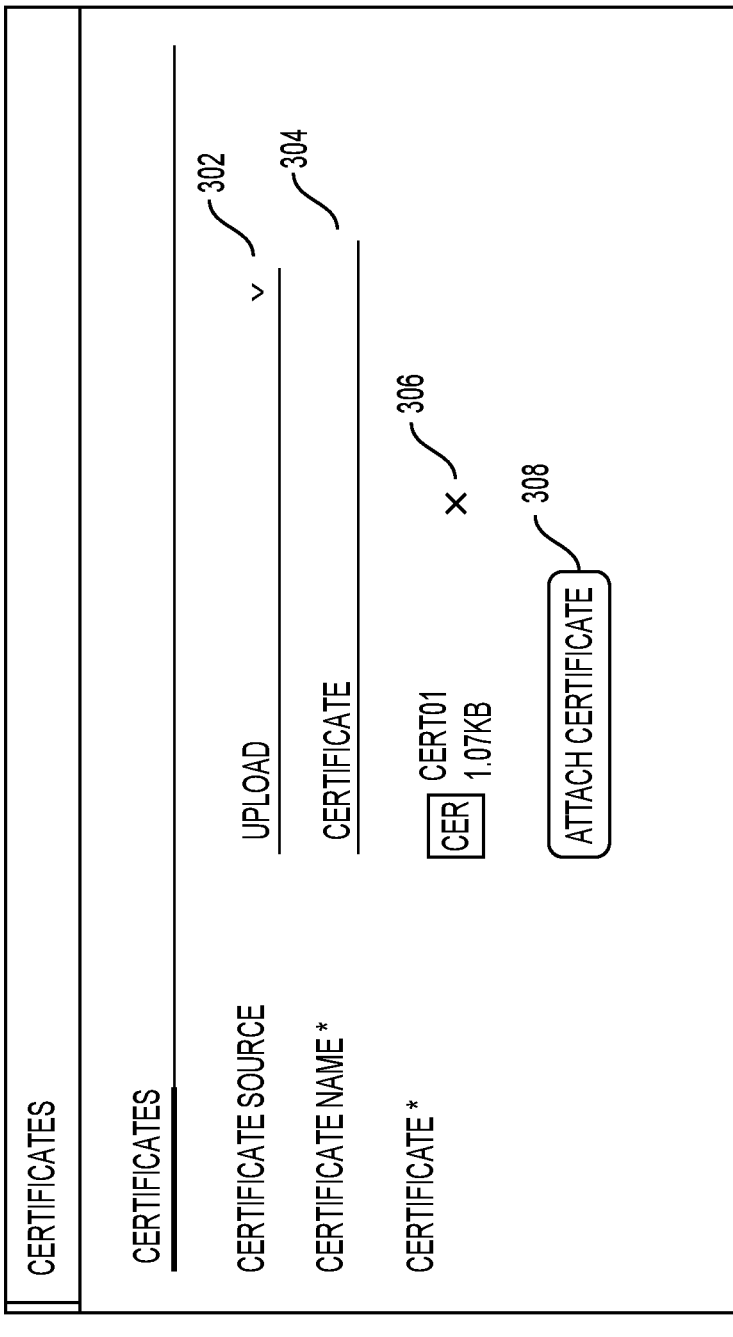
FIG. 3 is an illustration of an example GUI for creating a certificate-enforced network for devices in a logical group.

FIG. 3 is an illustration of an example security certificate upload tool 300 that can be included in a GUI for creating a certificate-enforced network for devices in a logical group. The security certificate upload tool 300 can include a certificate source selector 302. The certificate source selector 302 can be a drop-down menu that includes a list of the types of sources from where a certificate can be provided. As admin user can select a source type from the list, which can determine how the application obtains the certificate. For example, one option for a source type can be to upload the certificate. When the upload source type is selected, the admin device can launch a window where the admin user can navigate through files on the admin device and select the certificate file for uploading. After selecting the certificate file, the name of the certificate can appear in a certificate name field 304.

Another option for a source type can be a URL. When the URL upload source type is selected, the user can input the URL for the certificate into the certificate name field 304. In one example, after a URL is inputted, in the background the application can check the URL to determine whether the URL is valid and points to a correct file type. The source types described herein are merely exemplary, and they are not meant to include an exhaustive list of source types that can be used.

The security certificate upload tool 300 can include a certificate display 306 that displays an icon representing the certificate. The certificate display 306 can include the name of the security certificate. This can verify to the admin user that the security certificate has been properly identified. To upload the security certificate, the user can select an attach certificate button 308. The attach certificate button can be any type of selection mechanism.

Figure 4:
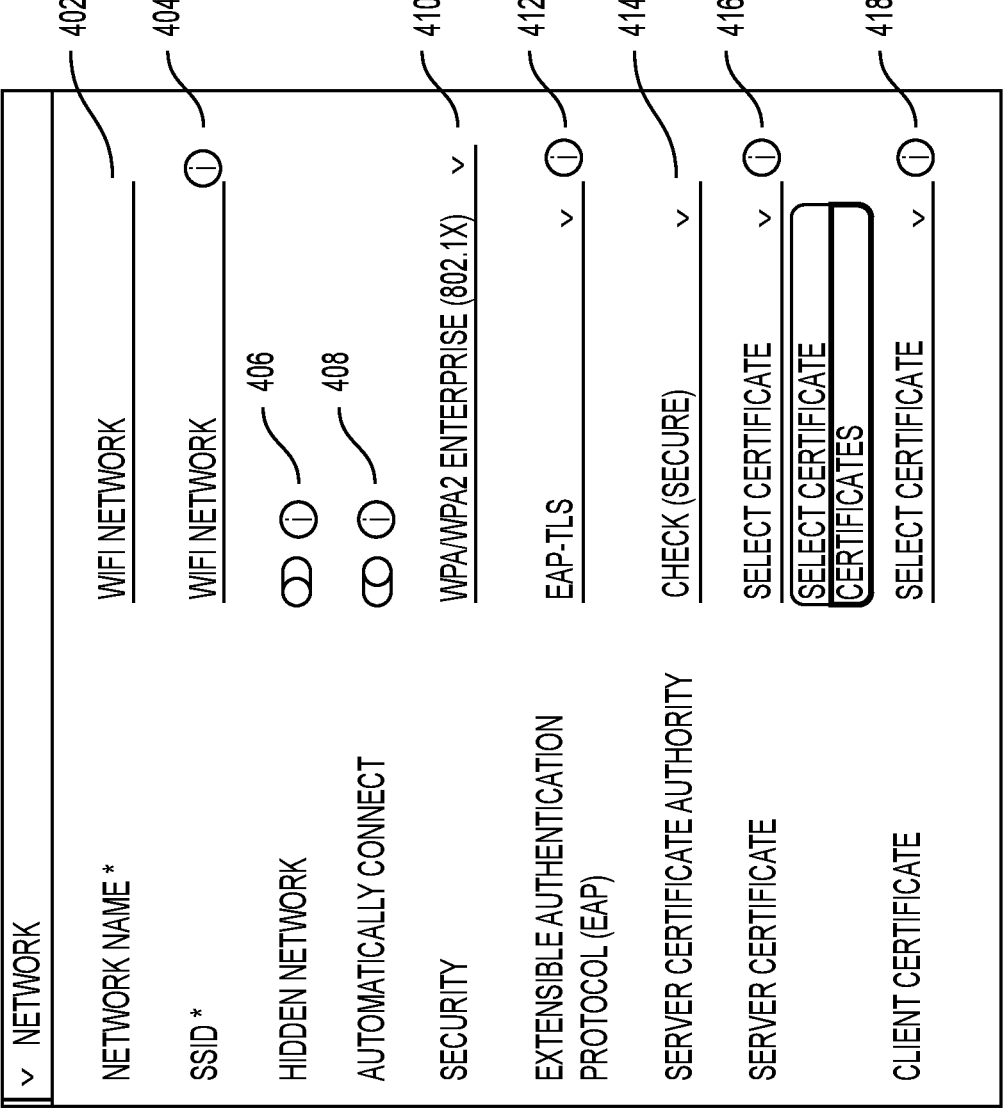
FIG. 4 is an illustration of another example GUI for creating a certificate-enforced network for devices in a logical group.

FIG. 4 is an illustration of an example network configuration tool 400 that can be included in a GUI for creating a certificate-enforced network for devices in a logical group. The network configuration tool 400 can include various fields and mechanisms for configuring a new network. For example, an admin user can input a network name into a network name field 402. The admin user can input an SSID for the network in an SSID field 404. The admin user can select a hidden network toggle 406 to designate whether the network's SSID is broadcast. The admin user can select an automatically connect toggle 408 to designate whether computing devices can automatically connect to the network.

The admin user can select a WIFI security type using a security type drop-down menu 410. The security type drop-down menu 410 can include a list of any available WIFI security types, such as WEP, WPA, and WPA2. The admin user can select an EAP using an EAP drop-down menu 412. The EAP drop-down menu 412 can include a list of any available EAO types, such as EAP-TLS, EAP-TTLS, and EAP-AKA. The admin user can designate whether the network checks for a server certificate using a server certificate authority drop-down menu 414. The admin user can select a certificate using a select server certificate drop-down menu 416. In one example, the select server certificate drop-down menu 416 can include a list of server certificates uploaded under profiles of an associated organization. The admin user can select a client certificate using a select client certificate drop-down menu 418. In one example, the select client certificate drop-down menu 418 can include a list of client certificates uploaded under profiles of an associated organization.

Figure 5:
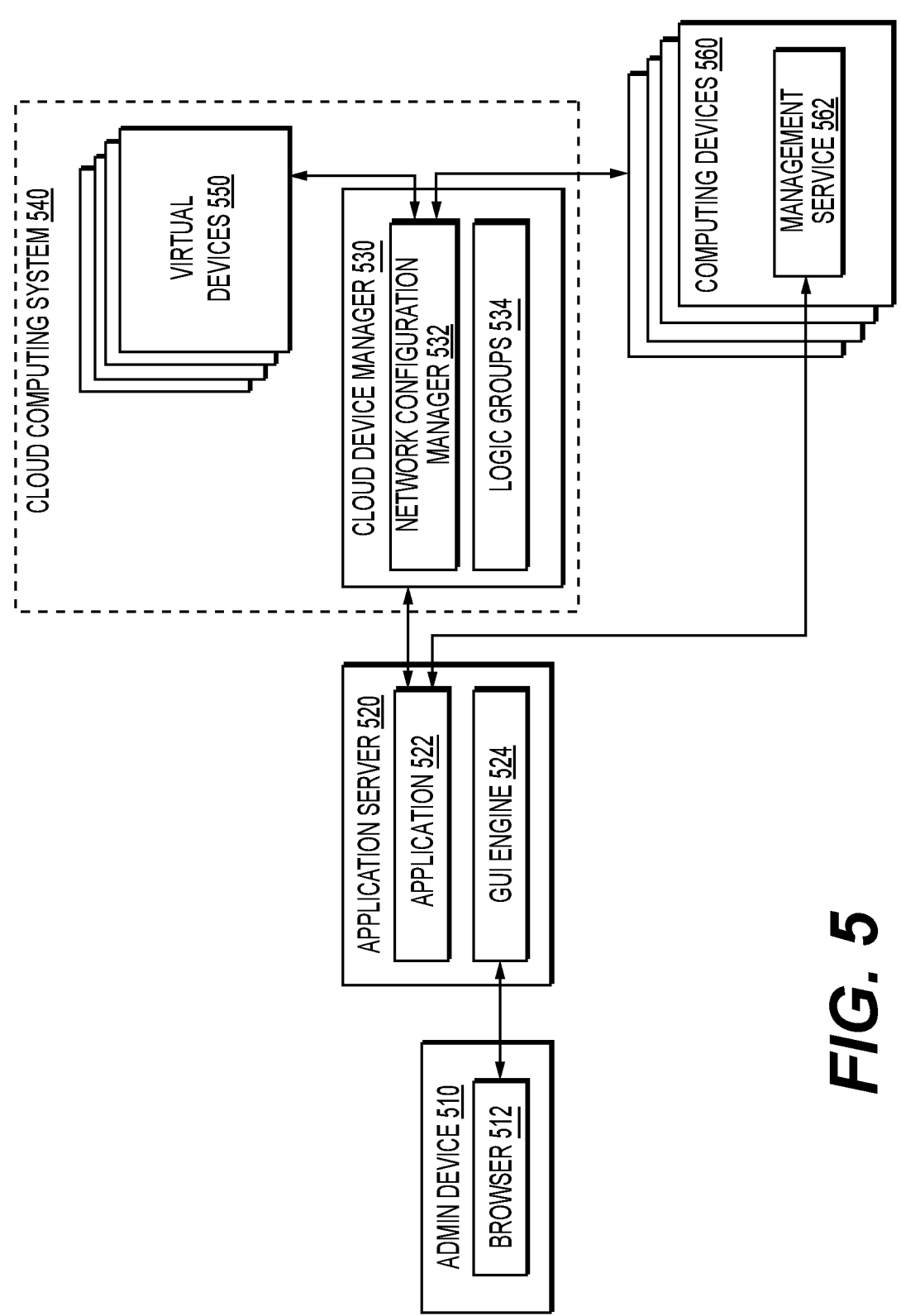
FIG. 5 is an illustration of an example system for performing creating a certificate-enforced network for devices in a logical group.

FIG. 5 is an illustration of an example system for providing a GUI for creating a certificate-enforced network for devices in a logical group. The GUI can be accessed at an admin device 510. The admin device 510 can any user device that an admin user has access to. For example, the admin device 510 can be one or more processor-based devices, such as a personal computer, tablet, or cell phone. The GUI can be a front-end interface of an application 522 that a user can interact with for creating networks through a third-party network configuration manager 532.

The application 522 can be hosted by an application server 520. The application server 520 can be a single server or a group of servers, including multiple servers implemented virtually across multiple computing platforms. For example, the application 522 can be a web-based application and the application server 52 can be a web server. In such an example, the admin user can access the GUI of the application 520 through a web browser 512 installed on the admin device 510. The web browser 512 can communicate with a GUI engine 524. The web browser 512 and GUI engine 524 can communicate using any appropriate communications protocol, such as HTTPS. The GUI engine 524 can be responsible for configuring the GUI and sending the GUI to user devices like the admin device 510. For example, when the admin device 510 requests the GUI, the application 522 can retrieve necessary application data and provide the application data to the GUI engine 524. Application data can include any data used in providing the GUI. For example, application data can include logical groups 534, security certificate IDs, and data specific to an organization or enterprise that the admin user belongs to. The GUI engine 524 can generate an HTML file of the GUI and insert the application data. The GUI engine 524 can send the HTML file to the admin device 510 and receive any calls or requests made by the GUI at the web browser 512. For example, the GUI engine 524 can receive uploaded security certificates, network configuration settings, and logical group 534 selections.

Alternatively, the application as a whole, the GUI, or other components of the application 522 may be installed directly on an admin device 510. In such examples, the application 522 can communicate with backend services of the application 522 running on the application server 520. The application 522 can communicate with the backend services using any appropriate communication protocol, such as API calls.

After an admin user provides a security certificate, network configuration settings, selects a logical group 534 for a network, the application 522 can send the security certificate to a cloud device manager 530. The cloud device manager 530 can be a cloud-based service for managing computing devices enrolled in an enterprise, such as smartphones, tablets, laptops, and desktop computers that are associated with an organization. The cloud device manager 530 can be part of a cloud computing system 540. The cloud computing system 540 can be a system that provides on-demand availability of computing resources without direct, active management by a user. Some examples of such systems can include GOOGLE CLOUD PLATFORM, MICROSOFT AZURE, and AWS.

The cloud device manager 530 can include a network configuration manager 532 that creates and manages networks from the cloud computing system 540. The application 522 can communicate with the network configuration manager 532 using any appropriate communication protocol. For example, the network configuration manager 532 can include APIs available to third parties. After an admin user provides a security certificate, network settings, a selection of a logical group 534 in the GUI, the application 522 can make a first API call to the network configuration manager 532 that includes the security certificate. The network configuration manager 532 can be configured to securely store the security certificate, generate a certificate ID, and send the certificate ID to the application 522. Without any additional user interaction required, the application 522 can send the certificate ID in another API call that also includes the network settings and selected logical group 534.

The network configuration manager 532 can be configured to create a network using the data provided by the application 522. This can include applying the network settings to computing devices in the selected logical group 534. Such computing devices can include, for example, virtual devices 550 and computing devices 560. Virtual devices 550 can include any virtual computing device hosted by the cloud computing system 540, such as VMs for the organization. The computing devices 560 can include any physical computing devices that belong to the enterprise. For example, the computing devices 560 can include user devices, physical servers, and endpoint devices. The network configuration manager 532 can push the network settings to the virtual devices 550 and any computing devices 560 that are managed directly by the cloud device manager 530.

Computing devices 560 that are not managed directly by the cloud manager 530 can include a management service 562. These computing devices 560 can be managed directly by an enterprise through a device management system like a UEM. The management service 562 can be an application or service that enforces UEM compliance and security settings. The management service 562 can be given permission to configure various settings on the computing device by communicating with the computing device's operating system OS, such as WIFI and VPN settings, passcode policies, and app configurations. For computing devices 560, the application 522 can send the network settings and security certificate to the management service 562, and the management service 562 can apply the settings to the respective computing device 560 so that the computing device can access the newly created network.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for providing a graphical user interface ("GUI") for creating a certificate-enforced network for computing devices in a logical group, comprising:
providing, in the GUI, a security certificate upload tool, a logical group selection tool, and a network configuration tool;
receiving, at the security certificate upload tool of the GUI, a security certificate;
receiving, at the logical group selection tool of the GUI, a selection of a logical group;
receiving, at the network configuration tool of the GUI, network settings for a network;
sending, to a server, the security certificate;
receiving, from the server, a certificate identifier ("ID") corresponding to the security certificate;
in response to receiving the certificate ID and without user input, sending, to the server, a request for creating the network, the request including the network settings, the selection of the logical group, and the certificate ID, wherein the network is created by the server based on the network settings and the security certificate, wherein the network is a virtual private cloud that includes one or more virtual machines managed by the server and one or more endpoint computing devices that are not managed by the server, wherein the server provides the security certificate to the one or more virtual machines in the virtual private cloud; and
transmitting, to the one or more endpoint computing devices, the security certificate, wherein the one or more endpoint computing devices use the security certificate to communicate on the virtual private cloud.

2. The method of claim 1, further comprising:
providing, in the GUI, a security certificate selection tool;
populating the security certificate selection tool with a list of security certificates uniquely associated with the selected logical group; and
prior to sending the security certificate to the server, receiving a selection of the security certificate at the security certificate selection tool.

3. The method of claim 1, further comprising storing the received certificate ID at a local cache, wherein the certificate ID is inserted into the request for creating the network from the local cache.

4. The method of claim 1, wherein the security certificate upload tool includes an option to select a previously uploaded security certificate that is unique to the selected logical group.

5. The method of claim 1, wherein providing the logical group selection tool comprises:
requesting, from the server, a list of logical groups;
receiving the list of logical groups from the server; and
populating a selectable list of the logical groups in the GUI.

6. The method of claim 1, further comprising:
storing the received security certificate at a local storage device; and
inserting a reference to the security certificate into a security certificate selection tool in the GUI.

7. The method of claim 1, wherein the server is a cloud-based computing device manager, and the network is created within a cloud-based computing system.

8. A non-transitory, computer-readable medium containing instructions that, when executed by a hardware-based processor, causes the processor to perform stages for providing a graphical user interface ("GUI") for creating a certificate-enforced network for computing devices in a logical group, the stages comprising:
providing, in the GUI, a security certificate upload tool, a logical group selection tool, and a network configuration tool;
receiving, at the security certificate upload tool of the GUI, a security certificate;
receiving, at the logical group selection tool of the GUI, a selection of a logical group;
receiving, at the network configuration tool of the GUI, network settings for a network;
sending, to a server, the security certificate;
receiving, from the server, a certificate identifier ("ID") corresponding to the security certificate;
in response to receiving the certificate ID and without user input, sending, to the server, a request for creating the network, the request including the network settings, the first selection of the logical group, and the certificate ID, wherein the network is created by the server based on the network settings and the security certificate, wherein the network is a virtual private cloud that includes one or more virtual machines managed by the server and one or more endpoint computing devices that are not managed by the server, wherein the server provides the security certificate to the one or more virtual machines in the virtual private cloud; and
transmitting, to the one or more endpoint computing devices, the security certificate, wherein the one or more endpoint computing devices use the security certificate to communicate on the virtual private cloud.

9. The non-transitory, computer-readable medium of claim 8, the stages further comprising:

providing, in the GUI, a security certificate selection tool;

populating the security certificate selection tool with a list of security certificates uniquely associated with the selected logical group; and prior to sending the security certificate to the server, receiving a selection of the security certificate at the security certificate selection tool.

10. The non-transitory, computer-readable medium of claim 8, the stages further comprising storing the received certificate ID at a local cache, wherein the certificate ID is inserted into the request for creating the network from the local cache.

11. The non-transitory, computer-readable medium of claim 8, wherein the security certificate upload tool includes an option to select a previously uploaded security certificate that is unique to the selected logical group.

12. The non-transitory, computer-readable medium of claim 8, wherein providing the logical group selection tool comprises:

requesting, from the server, a list of logical groups;

receiving the list of logical groups from the server; and populating a selectable list of the logical groups in the GUI.

13. The non-transitory, computer-readable medium of claim 8, the stages further comprising:

storing the received security certificate at a local storage device; and inserting a reference to the security certificate into a security certificate selection tool in the GUI.

14. The non-transitory, computer-readable medium of claim 8, wherein the server is a cloud-based computing device manager, and the network is created within a cloud-based computing system.

15. A system for providing a graphical user interface ("GUI") for creating a certificate-enforced network for computing devices in a logical group, comprising:

a memory storage including a non-transitory, computer-readable medium comprising instructions; and a hardware-based processor that executes the instructions to carry out stages comprising:

providing, in the GUI, a security certificate upload tool, a logical group selection tool, and a network configuration tool;

receiving, at the security certificate upload tool of the GUI, a security certificate;

receiving, at the logical group selection tool of the GUI, a selection of a logical group;

receiving, at the network configuration tool of the GUI, network settings for a network;

sending, to a server, the security certificate;

receiving, from the server, a certificate identifier ("ID") corresponding to the security certificate;

in response to receiving the certificate ID and without user input, sending, to the server, a request for creating the network, the request including the network settings, the selection of the logical group, and the certificate ID, wherein the network is created by the server based on the network settings and the security certificate, wherein the network is a virtual private cloud that includes one or more virtual machines managed by the server and one or more endpoint computing devices that are not managed by the server, wherein the server provides the security certificate to the one or more virtual machines in the virtual private cloud; and transmitting, to the one or more endpoint computing devices, the security certificate, wherein the one or more endpoint computing devices use the security certificate to communicate on the virtual private cloud.

16. The system of claim 15, the stages further comprising:

providing, in the GUI, a security certificate selection tool;

populating the security certificate selection tool with a list of security certificates uniquely associated with the selected logical group; and prior to sending the security certificate to the server, receiving a selection of the security certificate at the security certificate selection tool.

17. The system of claim 15, the stages further comprising storing the received certificate ID at a local cache, wherein the certificate ID is inserted into the request for creating the network from the local cache.

18. The system of claim 15, wherein the security certificate upload tool includes an option to select a previously uploaded security certificate that is unique to the selected logical group.

19. The system of claim 15, wherein providing the logical group selection tool comprises:

requesting, from the server, a list of logical groups;

receiving the list of logical groups from the server; and populating a selectable list of the logical groups in the GUI.

20. The system of claim 15, the stages further comprising:

storing the received security certificate at a local storage device; and inserting a reference to the security certificate into a security certificate selection tool in the GUI.

* * * * *